United States Patent
Montesello et al.

(10) Patent No.: US 10,202,006 B2
(45) Date of Patent: Feb. 12, 2019

(54) TYRE FOR VEHICLE WHEELS HAVING IMPROVED TREAD PATTERN

(71) Applicant: PIRELLI TYRE S.P.A., Milan (IT)

(72) Inventors: Stefano Montesello, Milan (IT); Gianfranco Colombo, Milan (IT); Roberto Bolzoni, Milan (IT); Maurizio Boiocchi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 116 days.

(21) Appl. No.: 15/107,286

(22) PCT Filed: Dec. 4, 2014

(86) PCT No.: PCT/EP2014/076604
§ 371 (c)(1),
(2) Date: Jun. 22, 2016

(87) PCT Pub. No.: WO2015/096963
PCT Pub. Date: Jul. 2, 2015

(65) Prior Publication Data
US 2017/0001477 A1   Jan. 5, 2017

(30) Foreign Application Priority Data
Dec. 23, 2013   (IT) .............................. MI2013A2188

(51) Int. Cl.
*B60C 11/03* (2006.01)
*B60C 11/11* (2006.01)
*B60C 11/12* (2006.01)

(52) U.S. Cl.
CPC ...... *B60C 11/0304* (2013.01); *B60C 11/0302* (2013.01); *B60C 11/0327* (2013.01);
(Continued)

(58) Field of Classification Search
CPC . B60C 11/03; B60C 11/0302; B60C 11/0304; B60C 11/0306; B60C 11/0327;
(Continued)

(56) References Cited

U.S. PATENT DOCUMENTS

| 5,088,536 A | 2/1992 | Graas et al. |
| 5,435,366 A * | 7/1995 | Voigt .................. B60C 11/0302 152/209.18 |
| 2006/0185776 A1* | 8/2006 | Lu ....................... B60C 11/0302 152/209.28 |

FOREIGN PATENT DOCUMENTS

| EP | 0 139 606 | 5/1985 |
| EP | 0788898 | * 8/1997 |

(Continued)

OTHER PUBLICATIONS

International Search Report from the European Patent Office for International Application No. PCT/EP2014/076804, dated Feb. 10, 2015.
(Continued)

*Primary Examiner* — Eric Hug
(74) *Attorney, Agent, or Firm* — Finnegan, Henderson, Farabow, Garrett & Dunner, L.L.P.

(57) ABSTRACT

Tire for vehicle wheels includes a tread pattern defined by modules arranged circumferentially along the tread, each of the modules including: a) a first slanted transverse groove extending from a first shoulder portion in the first half of the tread to a first end located in the second half of the tread; b) a second slanted transverse groove extending from a second shoulder portion in the second half of the tread to a second end located in the first half of the tread; c) a third slanted transverse groove extending from the first shoulder portion to a third end located in the first half of the tread; d) a fourth slanted transverse groove extending from the second shoulder portion to a fourth end located in the second half of the tread; wherein: e) the first end is substantially located at an intermediate portion of the second slanted transverse groove; and f) the second end is substantially located at an intermediate portion of the first slanted transverse groove of a circumferentially adjacent module.

16 Claims, 3 Drawing Sheets

(52) U.S. Cl.
CPC ........... *B60C 11/11* (2013.01); *B60C 11/1236* (2013.01); *B60C 11/12* (2013.01); *B60C 2011/0334* (2013.01); *B60C 2011/0358* (2013.01); *B60C 2011/0372* (2013.01); *B60C 2011/0374* (2013.01); *B60C 2011/1295* (2013.01)

(58) Field of Classification Search
CPC ............. B60C 11/11; B60C 2011/0334; B60C 2011/0372; B60C 2011/0374; B60C 2011/0358; B60C 2011/0337; B60C 2011/0339
USPC ............................. 152/209.1, 209.8, 209.28
See application file for complete search history.

(56) References Cited

FOREIGN PATENT DOCUMENTS

| WO | WO 02/068221 | | 9/2002 | |
|----|----|----|----|----|
| WO | WO 02/068222 | | 9/2002 | |
| WO | WO 2008/074353 | | 6/2008 | |
| WO | WO 2014/118659 | * | 8/2014 | ......... B60C 11/0302 |

OTHER PUBLICATIONS

Written Opinion of the International Searching Authority from the European Patent Office for International Application No. PCT/EP2014/076804, dated Feb. 10, 2015.

* cited by examiner

TYRE FOR VEHICLE WHEELS HAVING IMPROVED TREAD PATTERN

CROSS REFERENCE TO RELATED APPLICATIONS

This application is a national phase application based on PCT/EP2014/076604, filed Dec. 4, 2014, which claims the priority of Italian Patent Application No. MI2013A002188, filed Dec. 23, 2013, the content of each application being incorporated herein by reference.

FIELD OF THE INVENTION

The present invention relates to a tyre for vehicle wheels having an improved tread pattern, more in particular to a winter tyre especially suitable for driving on wet and snow roads, and having good driving performance also on dry road.

BACKGROUND OF THE ART

A winter tyre is supposed to ensure good traction and braking characteristics when used on snow (and possibly ice). However, a winter tyre also needs to provide good traction and braking characteristics when used on wet roads. Moreover, a winter tyre also needs to provide good driving performance on dry roads and low noise.

Winter or snow tyres have been designed with treads having traction blocks widely spaced by large and deep grooves that allow a good traction and brake on snow. The presence of large and deep traction grooves increases the void-to-rubber ratio of the tread, i.e., the amount of open space compared to the amount of rubber in the tread. A low void-to-rubber ratio means more rubber in contact with the road and vice versa. The high void-to-rubber ratio tread pattern is excellent in deep snow because snow is trapped in the void spaces and increases the grip. However, these tread patterns reduce the stiffness of the tread and generate substantial noise and block mobility when used on wet or dry roads. Moreover, the tread wear rate is rapid and therefore these tyres are considered for use only during the snowy winter months.

The use of treads having a high density of sipes made on the blocks has provided a good improvement to both snow and ice traction performance. Such heavily bladed tyres can exhibit good winter ice traction performance by providing an increased number of tread edges to provide forward traction.

Furthermore, the performance of a tread on wet roads is increased by the presence of grooves able to drain water from the contact surface of the tread with the road. This is accomplished in the art by longitudinal or transverse grooves. The wider the groove, the higher the amount of drained water. However, broad longitudinal grooves reduce the traction on snow and broad transverse grooves reduce the stiffness of the tread, again increasing the noise, block mobility and wear when driving on dry road. WO02/068221, WO02/068222, U.S. Pat. No. 5,435,366, EP 139,606, U.S. Pat. No. 5,088,536, WO08/074353 disclose exemplary known tread patterns which provide snow or all season performance.

SUMMARY OF THE INVENTION

In view of the above, it is clear that a winter tyre needs to satisfy several conflicting requirements in order to provide good performances on all the various road and weather conditions, together with low noise.

The Applicant has found that by providing a tread pattern with a pair of slanted transverse grooves which extend from the shoulder portions of the tread (in opposite directions with each other), cross the equatorial plane and wherein each groove ends at an intermediate portion of the other groove, and with another pair of slanted grooves which extend from the shoulder portions of the tread to a respective end located before crossing the equatorial plane, the resulting tyre has a very stable and improved behaviour on all road conditions (dry, wet, snow), together with low noise.

In a first aspect, the present invention relates to a tyre for vehicle wheels comprising a tread having a tread pattern. The tread is separable by an equatorial plane in a first half and in a second half. The first half of said tread comprises a first shoulder portion, and the second half of said tread comprises a second shoulder portion.

The tread pattern comprises a sequence of substantially identical modules of grooves circumferentially disposed along said tread. Each of said modules comprises:

a) a first slanted transverse groove extending from said first shoulder portion of said tread to a first end, said first slanted transverse groove crossing said equatorial plane so that said first end is located in said second half of said tread;

b) a second slanted transverse groove extending from said second shoulder portion of said tread to a second end, said second slanted transverse groove crossing said equatorial plane so that said second end is located in said first half of said tread;

c) a third slanted transverse groove extending from said first shoulder portion of said tread to a third end located in said first half of said tread;

d) a fourth slanted transverse groove extending from said second shoulder portion of said tread to a fourth end located in said second half of said tread.

In a preferred aspect of the inventive tread:

e) said first end is substantially located at an intermediate portion of said second slanted transverse groove; and/or f) said second end is substantially located at an intermediate portion of a first slanted transverse groove of a circumferentially adjacent module.

The alternance of the slanted grooves allows maintaining substantially geometrically homogeneous shoulder portions, while at the tread center the tread pattern changes continuously its shape in the circumferential direction.

In particular, such features have lead to obtain advantages in traction and braking characteristics both on wet and snowed roads, still maintaining a significant amount of rubber portions touching the ground in the central portion of the footprint area. This has allowed keeping the tread center particularly stiff, with further advantages in terms of running on dry roads, low noise and regular wear.

Preferably the tread pattern has a preferred rolling direction (i.e. it is a directional tread pattern).

Preferably, the first, second, third and fourth slanted grooves are inclined to point towards the rolling direction.

Further preferred aspects of the inventive tread are disclosed hereinbelow.

Preferably, said first, second, third and/or fourth ends are located at a distance between $1/10$ and $1/3$ of a width of said first half and/or second half of the tread from said equatorial plane of said tyre.

Preferably, said first and/or second slanted transverse groove has an increasing inclination in a direction from the equatorial plane to the first and/or, respectively, second shoulder portion of the tread.

Preferably, at the crossing of the equatorial plane of the tyre said first and/or second slanted transverse groove form an angle of between 30° and 55° with respect to the equatorial plane.

Preferably, at said first and/or second shoulder portion said first and/or, respectively, second slanted transverse groove forms an angle of between 60° and 90° with respect to a direction parallel to the equatorial plane of the tyre.

Preferably, said third and/or fourth slanted transverse groove has an increasing inclination in a direction from the equatorial plane to the first and/or, respectively, second shoulder portion of the tread.

Preferably, at said first and/or second shoulder portion said third and/or, respectively, fourth slanted transverse groove forms an angle of between 60° and 90° with respect to a direction parallel to the equatorial plane of the tyre.

Each of said modules may comprise:

g) a first bridging groove extending substantially from said third end of said third slanted transverse groove towards said first slanted transverse groove;

h) a second bridging groove extending substantially from said fourth end of said fourth slanted transverse groove towards said second slanted transverse groove.

Preferably, said first bridging groove connects said third slanted transverse groove to said first slanted transverse groove.

Preferably, said second bridging groove connects said fourth slanted transverse groove to said second slanted transverse groove.

Preferably, said first bridging groove is counter inclinated with respect to said first and/or third slanted transverse grooves.

Preferably, said second bridging groove is counter inclinated with respect to said second and/or fourth slanted transverse grooves.

Preferably, said first and/or second bridging groove forms an angle of between 70° and 90° with a direction of extension of said third and/or, respectively, fourth slanted transverse groove.

Preferably, said first and/or second bridging grooves connects with said third and/or, respectively, fourth slanted transverse groove at or close to the equatorial plane of the tyre.

Preferably, said first and/or second bridging groove forms an angle of between 20° and 50° with respect to a direction parallel to the equatorial plane of the tyre.

Each of said modules may comprise:

i) a third bridging groove extending between said third slanted transverse groove and said first slanted transverse groove;

j) a fourth bridging groove extending between said fourth slanted transverse groove and said second slanted transverse groove.

Preferably, said third bridging groove is counter inclinated with respect to said first and third slanted transverse grooves.

Preferably, said fourth bridging groove is counter inclinated with respect to said second and fourth slanted transverse grooves.

Preferably, said third bridging groove connects said third slanted transverse groove to said first slanted transverse groove.

Preferably, said fourth bridging groove connects said fourth slanted transverse groove to said second slanted transverse groove.

Preferably, said third and/or fourth bridging groove forms an angle of between 70° and 90° with a direction of extension of said third and/or, respectively, fourth slanted transverse groove.

Preferably, said third and/or fourth bridging groove is located in an axially outer position with respect to said first and/or, respectively, second bridging groove.

Preferably, said third and/or fourth bridging groove has a lower inclination than said first and/or, respectively, second bridging groove with respect to a direction parallel to the equatorial plane of the tyre.

Preferably, said third and/or fourth bridging groove forms an angle of between 0° (more preferably 5°) and 40° with respect to a direction parallel to the equatorial plane of the tyre.

Each of said modules may comprise:

k) a fifth bridging groove extending between said third slanted transverse groove and said first slanted transverse groove of said circumferentially adjacent module;

l) a sixth bridging groove extending between said fourth slanted transverse groove and a second slanted transverse groove of said circumferentially adjacent module.

Preferably, said fifth bridging groove is counter inclinated with respect to said third slanted transverse groove.

Preferably, said sixth bridging groove is counter inclinated with respect to said fourth slanted transverse groove.

Preferably, said fifth bridging groove connects said third slanted transverse groove to said first slanted transverse groove of said circumferentially adjacent module.

Preferably, said sixth bridging groove connects said fourth slanted transverse groove to said second slanted transverse groove of said circumferentially adjacent module.

Preferably, said fifth and/or sixth bridging groove forms an angle of between 70° and 90° with a direction of extension of said third and/or, respectively, fourth slanted transverse groove.

Preferably, said fifth and/or sixth bridging groove is located in an axially outer position with respect to said first and/or, respectively, second bridging groove.

Preferably, said fifth bridging groove is located in an axially intermediate portion of the first half of the tread, between said first and third bridging groove.

Preferably, said sixth bridging groove is located in an axially intermediate portion of the second half of the tread, between said second and fourth bridging groove.

Preferably, said fifth and/or sixth bridging groove has a lower inclination than said first and/or, respectively, second bridging groove with respect to a direction parallel to the equatorial plane of the tyre.

Preferably, said fifth and/or sixth bridging groove has an inclination substantially parallel to the inclination of said third and/or, respectively, fourth bridging groove.

Preferably, said fifth and/or sixth bridging groove forms an angle of between 0° (more preferably 5°) and 40° with respect to a direction parallel to the equatorial plane of the tyre.

The presence of the first, second, third, fourth, fifth, and/or sixth bridging grooves allows creating an alternating pattern of rubber portions (e.g. blocks) in the tread center, to improve grip and traction in substantially all road conditions.

Each of said modules may comprise:

m) a first V-shaped block formed between said third slanted transverse groove and said first slanted transverse groove of said circumferentially adjacent module; and/or n) a second V-shaped block formed between said fourth slanted transverse groove and said second slanted transverse groove of said circumferentially adjacent module.

Preferably, said first V-shaped block has vertices located in said first half of the tread.

Preferably, said second V-shaped block has vertices located in said second half of the tread.

Preferably, said vertices of said first V-shaped block are located at a distance between ⅒ and ⅓ of a width of said first half of the tread from said equatorial plane of said tyre.

Preferably, said vertices of said second V-shaped block are located at a distance between ⅒ and ⅓ of a width of said second half of the tread from said equatorial plane of said tyre.

Each of said modules may comprise:

o) a first substantially rectangular block formed between said first and third slanted transverse grooves; and/or p) a second substantially rectangular block formed between said second and fourth slanted transverse grooves.

Preferably, said first substantially rectangular block is entirely located in said first half of the tread.

Preferably, said second substantially rectangular block is entirely located in said second half of the tread.

Preferably, said first V-shaped block and said first substantially rectangular block are circumferentially adjacent.

Preferably, said second V-shaped block and said second substantially rectangular block are circumferentially adjacent.

Preferably, said first V-shaped block and said second substantially rectangular block are axially adjacent.

Preferably, said second V-shaped block and said first substantially rectangular block are axially adjacent.

The presence of the V-shaped blocks advantageously creates a central portion of the tread having a well balanced directionality in both halves of the tread, which has been found to be advantageous in traction and braking on snowed roads.

Preferably, the rubber portions (e.g. blocks) formed by the grooves of said modules comprise a plurality of sipes.

Preferably, the tread pattern does not comprise circumferential grooves running through the whole circumference of the tyre.

In such way the central portion remains stiff, with further advantages during running in substantially all road conditions.

For the purpose of better understanding the present invention, the term "equatorial plane" means the plane perpendicular to the tyre axis of rotation and passing through the center of the tread; the term "groove" means an elongated void area in a tread (typically having a width greater than or equal to 1-2 mm at the tread surface) that may extend circumferentially or transversely; the term "sipe" means a thin cut formed into a tread (typically having a width lower than 1 mm at the tread surface) and extending over rubber portions (e.g. blocks) of very limited extension.

Unless otherwise indicated in the present description, each angle used to indicate the inclination of a given tread pattern element is intended to be calculated as the (lower) angle defined between the equatorial plane of the tyre (or a direction parallel to the equatorial plane of the tyre) and the plane said given tread pattern element belongs to.

DESCRIPTION OF EMBODIMENTS OF THE INVENTION

Figure 1:
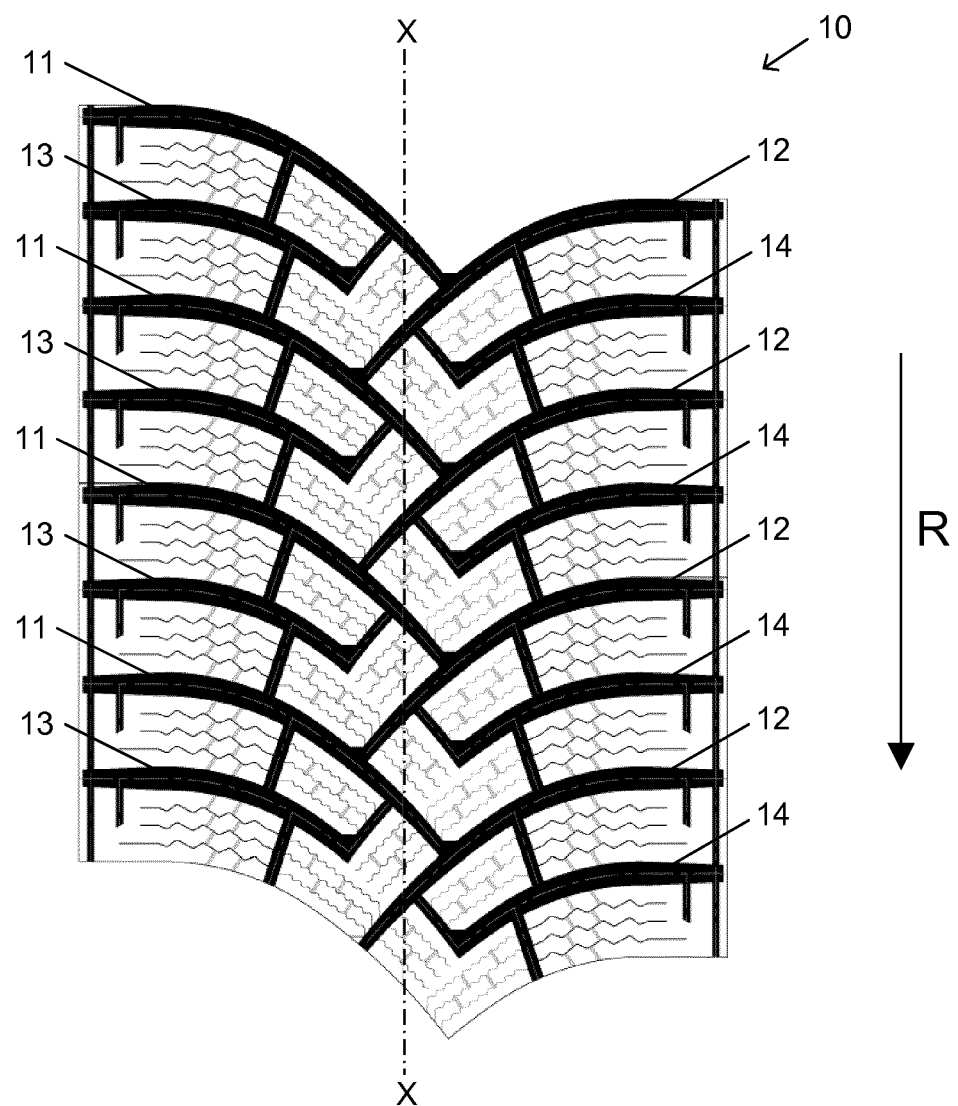
FIG. 1 is a plan view of a tyre tread portion in accordance with an embodiment of the present invention.

FIG. 1 is a plan view of a portion of the tyre tread pattern 10 in accordance with a preferred embodiment of the present invention.

The tread pattern 10 has a preferred rolling direction R (i.e. it is a directional tread pattern).

The equatorial plane X-X separates the tread in a first (left) half and in a second (right) half, extending from the tread shoulder portions (i.e. the axially outer portions of the tread) to the equatorial plane X-X.

Figure 2:
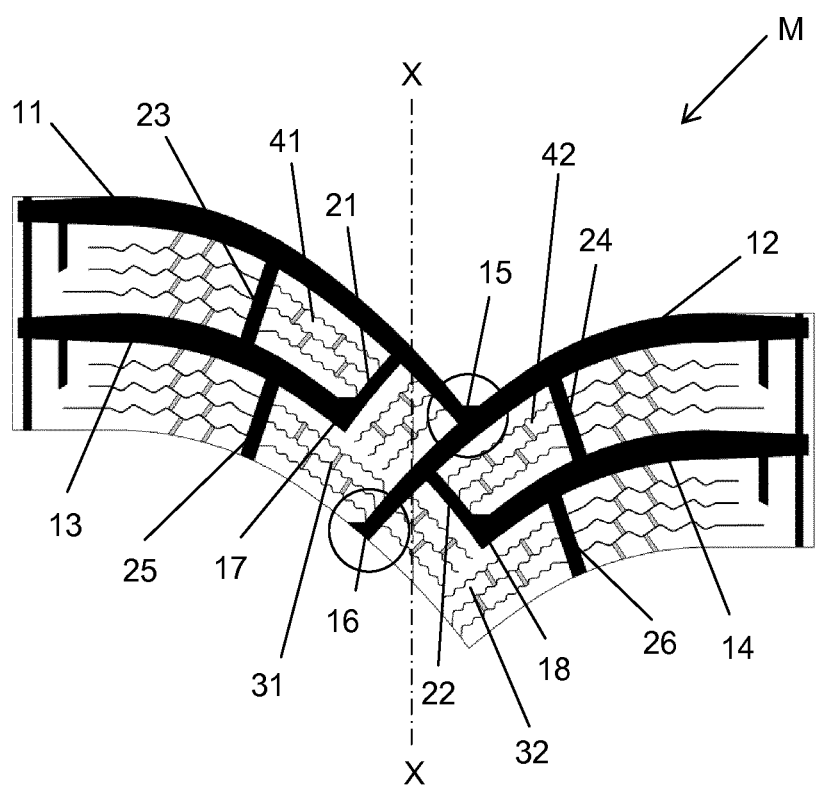
FIG. 2 is a plan view of a module of the tyre tread pattern in accordance with an embodiment of the present invention.

With reference to FIGS. 1 and 2, the tread pattern 10 comprises a sequence of substantially identical modules M of grooves circumferentially disposed along said tread.

In particular, each of said modules M comprises a first slanted transverse groove 11 extending from the left shoulder portion of the tread to a first end 15, and a second slanted transverse groove 12 extending from the right shoulder portion of the tread to a second end 16.

The first slanted transverse groove 11, which starts from the left half of the tread, then crosses the equatorial plane X-X so that its end 15 is located in the right half of the tread.

The second slanted transverse groove 12, which starts from the right half of the tread, then crosses the equatorial plane X-X so that its end 16 is located in the left half of the tread.

The end 15 of the first slanted transverse groove 11 is substantially located at an intermediate portion (highlighted by a circle in FIG. 2) of said second slanted transverse groove 12. By "substantially located at an intermediate portion" it is meant that the end 15 of the first slanted transverse groove 11 is located at least proximally to an intermediate portion of the second slanted transverse groove 12, i.e. the first slanted transverse groove 11 can either directly connect to the second slanted transverse groove 12 or end closely (e.g. within few millimeters) to the second slanted transverse groove 12.

The end 16 of the second slanted transverse groove 12 is substantially located at an intermediate portion (highlighted by a circle in FIG. 2) of a first slanted transverse groove 11 of the circumferentially adjacent module M. As above, it is meant that the end 16 of the second slanted transverse groove 12 is located at least proximally to an intermediate portion of the first slanted transverse groove 11 of the circumferentially adjacent module, i.e. the second slanted transverse groove 12 can either directly connect to such first slanted transverse groove 11 or end closely (e.g. within few millimeters) to such first slanted transverse groove 11.

Each of said modules M further comprises a third slanted transverse groove 13 extending from the left shoulder portion of the tread to a third end 17 located in the same left half of the tread, and a fourth slanted transverse groove 14 extending from the right shoulder portion of the tread to a fourth end 18 located in the same right half of the tread.

The alternance, in the circumferential direction, of the slanted grooves 11, 12, 13, 14 allows maintaining substantially geometrically homogeneous left and right shoulder portions, in which substantially corresponding blocks are formed between the grooves 11, 12, 13, 14.

At the same time, at the tread center the portions of the tread pattern 10 change continuously their shape in the circumferential direction, due to the different location of the ends 15, 16, 17, 18 of the slanted grooves 11, 12, 13, 14.

The Applicant has found that such features lead to obtain advantages both in traction and in braking, particularly on wet and snowed roads, without the need of increasing significantly the void-to-rubber ratio in the central portion of the tread. A significant amount of rubber touching the ground within the central portion of the footprint can thus be maintained, so as to keep the tread center particularly stiff, with further advantages in terms of running on dry roads, low noise and regular wear. As shown in the figures, the slanted grooves 11, 12, 13, 14 are inclined to point towards the rolling direction R.

The ends 15, 16, 17, 18 of the slanted grooves 11, 12, 13, 14 are located at a distance from the equatorial plane X-X comprised between 1/10 and 1/3 of the width of the left half or right half of the tread.

The first and the second slanted transverse groove 11, 12 have an increasing inclination in a direction from the equatorial plane X-X to the left and, respectively, the right shoulder portion of the tread.

Preferably, at the crossing of the equatorial plane X-X of the tyre the first and/or the second slanted transverse groove 11, 12 form an angle of between about 30° and 55° with respect to the equatorial plane X-X. In the embodiment shown in the figures, the first and second slanted transverse grooves 11, 12 form an angle of about 42° with the equatorial plane X-X.

Preferably, at the left/right shoulder portion said first/second slanted transverse groove 11, 12 forms an angle of between 60° and 90° with respect to a direction parallel to the equatorial plane X-X of the tyre. In the embodiment shown in the figures, the first and second slanted transverse grooves 11, 12 form an angle of about 85° with a direction parallel to the equatorial plane X-X of the tyre.

Also the third and the fourth slanted transverse grooves 13, 14 have an increasing inclination in a direction from the equatorial plane X-X to the left and right shoulder portions of the tread.

Preferably, at the left/right shoulder portion said third/fourth slanted transverse groove 13, 14 forms an angle of between 60° and 90° with respect to a direction parallel to the equatorial plane of the tyre. In the embodiment shown in the figures, the third and fourth slanted transverse grooves 13, 14 form an angle of about 90° with a direction parallel to the equatorial plane X-X of the tyre.

Each of said modules M further comprises, on the left half, a first bridging groove 21, extending substantially from the third end 17 of the third slanted transverse groove 13 towards the first slanted transverse groove 11. Moreover, each of said modules M further comprises, on the right half, a second bridging groove 22, extending substantially from the fourth end 18 of the fourth slanted transverse groove 14 towards the second slanted transverse groove 12.

Preferably, the first bridging groove 21 connects the third slanted transverse groove 13 to the first slanted transverse groove 11.

Preferably, the second bridging groove 22 connects the fourth slanted transverse groove 14 to the second slanted transverse groove 12.

In the embodiment shown in the figures, the first bridging groove 21 is counter inclinated with respect to the first and/or the third slanted transverse groove 11, 13. Analogously, the second bridging groove 22 is counter inclinated with respect to the second and/or the fourth slanted transverse groove 12, 14.

Preferably, the first and/or the second bridging groove 21, 22 forms an angle of between about 70° and 90° with a direction of extension of the third and/or, respectively, the fourth slanted transverse groove 13, 14. In the embodiment shown in the figures, the first and the second bridging grooves 21, 22 form an angle of about 85° with respect to the extension direction of the third and, respectively, the fourth slanted transverse grooves 13, 14.

Preferably, the first and/or the second bridging grooves 21, 22 connect with the third and/or, respectively, the fourth slanted transverse grooves at or close to the equatorial plane X-X of the tyre.

Preferably, the first and/or the second bridging groove 21, 22 forms an angle of between about 20° and 50° with respect to a direction parallel to the equatorial plane X-X of the tyre. In the embodiment shown in the figures, the first and the second bridging grooves 21, 22 form an angle of about 40° with respect to a direction parallel to the equatorial plane X-X of the tyre.

Each of said modules M further comprises, on the left half, a third bridging groove 23 extending between the third slanted transverse groove 13 and the first slanted transverse groove 11.

Moreover, each of said modules M further comprises, on the right half, a fourth bridging groove 24 extending between the fourth slanted transverse groove 14 and the second slanted transverse groove 12.

In the embodiment shown in the figures, the third bridging groove 23 is counter inclinated with respect to the first and/or the third slanted transverse groove 11, 13. Analogously, the fourth bridging groove 24 is counter inclinated with respect to the second and/or the fourth slanted transverse groove 12, 14.

Preferably, the third bridging groove 23 connects the third slanted transverse groove 13 to the first slanted transverse groove 11, at intermediate portions thereof.

Analogously, the fourth bridging groove 24 connects the fourth slanted transverse groove 14 to the second slanted transverse groove 12, at intermediate portions thereof.

Preferably, the third and/or fourth bridging groove 23, 24 forms an angle of between about 70° and 90° with a direction of extension of the third and/or, respectively, fourth slanted transverse groove 13, 14. In the embodiment shown in the figures, the third and the fourth bridging grooves form an angle of about 80° with the extension direction of the third and, respectively, the fourth slanted transverse grooves 13, 14.

The third and the fourth bridging grooves 23, 24 are located in an axially outer position with respect to the first and, respectively, the bridging grooves 21, 22.

Preferably, the third and the fourth bridging grooves 23, have a lower inclination than the first and, respectively, the second bridging grooves 21, 22 with respect to a direction parallel to the equatorial plane X-X of the tyre.

Preferably, the third and/or the fourth bridging groove 23, 24 forms an angle of between about 0° (more preferably) 5° and 40° with respect to a direction parallel to the equatorial plane X-X of the tyre. In the embodiment shown in the figures, the third and the fourth bridging grooves 23, 24 form an angle of about 25° with respect to a direction parallel to the equatorial plane X-X of the tyre.

Each of said modules M further comprises, on the left half, a fifth bridging groove 25 extending between the third slanted transverse groove 13 and the first slanted transverse groove 11 of the circumferentially adjacent module.

Moreover, each of said modules M further comprises, on the right half, a sixth bridging groove 26 extending between the fourth slanted transverse groove 14 and a second slanted transverse groove 12 of the circumferentially adjacent module.

In the embodiment shown in the figures, the fifth bridging groove 25 is counter inclinated with respect to the third slanted transverse groove 13. Analogously, the fourth bridging groove 26 is counter inclinated with respect to the fourth slanted transverse groove 14.

Preferably, the fifth bridging groove 25 connects the third slanted transverse groove 13 to the first slanted transverse groove 11 of the circumferentially adjacent module.

Analogously, the sixth bridging groove 26 connects the fourth slanted transverse groove 14 to the second slanted transverse groove 12 of the circumferentially adjacent module.

Preferably, the fifth and/or the sixth bridging groove 25, 26 forms an angle of between about 70° and 90° with a direction of extension of the third and/or, respectively, the fourth slanted transverse groove 13, 14. In the embodiment shown in the figures, the fifth and the sixth bridging grooves 25, 26 form an angle of about 80° with respect to the extension direction of the third and, respectively, the fourth slanted transverse grooves 13, 14.

The fifth and the sixth bridging grooves 25, 26 are located in an axially outer position with respect to the first and, respectively, the second bridging groove 21, 22.

In the embodiment shown in the figures, the fifth bridging groove 25 is located in an axially intermediate portion of the left half of the tread, between the first and the third bridging grooves 21, 23. Moreover, the sixth bridging groove 26 is located in an axially intermediate portion of the right half of the tread, between the second and the fourth bridging grooves 22, 24.

Preferably, the fifth and the sixth bridging grooves 25, 26 have a lower inclination than the first and, respectively, the second bridging grooves 21, 22 with respect to a direction parallel to the equatorial plane X-X of the tyre.

Preferably, the fifth and/or the sixth bridging groove 25, 26 forms an angle of between about 0° (more preferably 5°) and 40° with respect to a direction parallel to the equatorial plane X-X of the tyre.

In the embodiment shown in the figures, the fifth and the sixth bridging grooves 25, 26 have an inclination substantially parallel to the inclination of the third and, respectively, the fourth bridging grooves 23, 24.

The presence of the first, second, third, fourth, fifth, and/or sixth bridging grooves 21, 22, 23, 24, 25, 26 allows creating an alternating pattern of blocks in the central portion of the tread, which improves grip and traction in substantially all road conditions.

In the preferred embodiment shown in the figures, each of said modules M may comprise, in the central portion of the tread, a first V-shaped block 31 formed between the third slanted transverse groove 13 and the first slanted transverse groove 11 of the circumferentially adjacent module, and a second V-shaped block 32 formed between the fourth slanted transverse groove 14 and the second slanted transverse groove 12 of the circumferentially adjacent module.

In particular, the first V-shaped block 31 has vertices located in the left half of the tread and the second V-shaped block 32 has vertices located in the right half of the tread.

The vertices of the first and/or second V-shaped block 31, 32 can be located at a distance from the equatorial plane X-X of said tyre comprised between about ⅒ and ⅓ of the width of the left/right half of the tread.

Moreover, each of said modules M may comprise, in the central portion of the tread, a first substantially rectangular block 41 formed between the first and third slanted transverse grooves 11, 13, and a second substantially rectangular block 42 formed between the second and fourth slanted transverse grooves 12, 14.

In particular, as shown in the figures, said first substantially rectangular block 41 is entirely located in the left half of the tread, and said second substantially rectangular block 42 is entirely located in the right half of the tread.

In such preferred embodiment, the first V-shaped block 31 and the first substantially rectangular block 41 are circumferentially adjacent. Moreover, the second V-shaped block 32 and the second substantially rectangular block 42 are also circumferentially adjacent.

However, as shown in the figures, the first V-shaped block 31 and the second substantially rectangular block 42 are axially adjacent. Moreover, the second V-shaped block 32 and the first substantially rectangular block 41 are axially adjacent.

Figure 3:
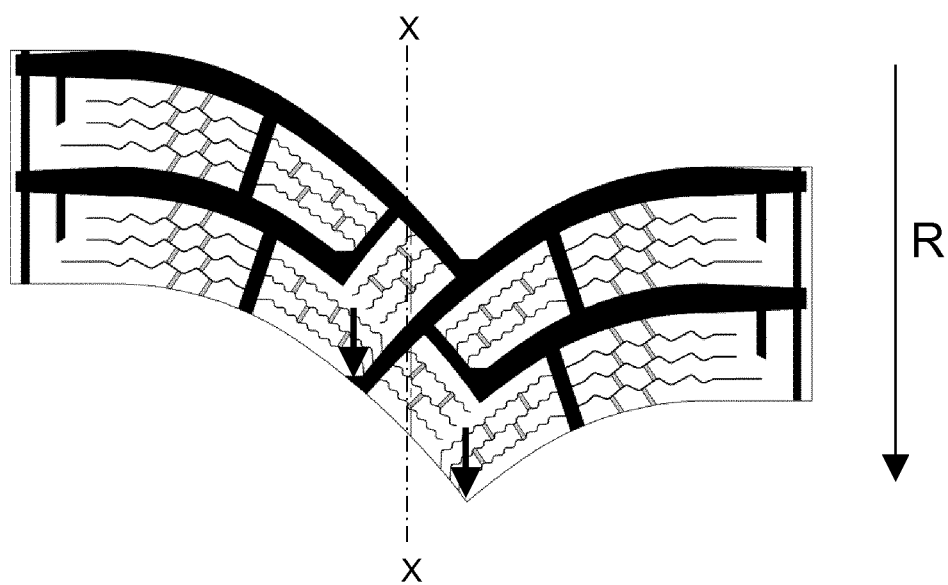
FIG. 3 is a plan view of the module of the tyre tread pattern of FIG. 2, showing a preferred feature of the invention.

The presence of the V-shaped blocks 31, 32 advantageously creates a central portion of the tread having a well balanced directionality in both the left and right halves of the tread, which has been found to be advantageous in traction and braking on snowed roads. As it is shown particularly by FIG. 3, the V-shaped blocks define a sort of "double directionality" (as shown by the pair of arrows pointing in the same direction of the preferred rolling direction R of the tyre), on the left and on the right hand side of the equatorial plane X-X of the tyre, which has proven to be advantageous.

As typical for winter tyres, the rubber portions (e.g. blocks) formed by the grooves of said modules comprise a plurality of sipes. In the embodiment shown in the figures, the sipes formed in the central blocks 31, 32, 41, 42 and in the shoulder blocks follow an overall direction of extension substantially parallel to the extension direction of the slanted grooves 11, 12, 13, 14. However, it can be provided that at least some of the sipes could follow an overall direction of extension being counter inclined with respect to at least some of the slanted grooves 11, 12, 13, 14, or other extension directions (e.g. an overall direction substantially parallel to an axial direction).

Preferably, the sipes may follow an undulated path. In the preferred embodiment shown in the figures, the undulation frequency of the sipes located in the central portion of the tread is higher than the undulation frequency of the sipes located in the shoulder portions of the tread.

In the embodiment shown in the figures, some bridging sipes connect some of the substantially parallel sipes, to form a "beehive" pattern. In the embodiment shown in the figures, the bridging sipes are inclined with respect to a direction parallel to the equatorial plane of the tyre. However, it can be provided that at least some of the bridging sipes are directed along a substantially circumferential direction. For example, inclined bridging sipes can be provided at shoulder portions of the tread and circumferentially directed bridging sipes can be provided in the central portion of the tread.

Preferably, the tread pattern 10 does not comprise circumferential grooves running through the whole circumference of the tyre.

This allows keeping an overall low void-to-rubber ratio (without considering the void introduced by the sipes), particularly in the central portion of the tread, so as to further improve stiffness in the central portion of the tread, with further advantages during running in substantially all road conditions. This has also proven to be advantageous for tyres having small section width (e.g. lower than 220 mm), in which a significantly increased amount or rubber portions can be kept in the central portion of the tread.

EXAMPLE

Two tyres having size 185/65 R15, differing only for the tread pattern, have been tested for a number of performances. The comparison tyre was a tyre made according to the teachings of the above mentioned document WO08/074353, while the invention tyre was made as shown in the figures of the present document.

The following table shows the overall results obtained after a number of tests performed in different road conditions. The results obtained by the comparison tyre were taken as reference, so that the results for the invention tyre directly show the improvement obtained. As it can be seen, the invention tyre scored better or much better than the comparison tyre in almost all road conditions, as well as in the noise tests.

|  | Comparison | Invention |
| --- | --- | --- |
| Noise | 100.0 | 105.0 |
| Wet Braking | 100.0 | 103.0 |
| Wet handling | 100.0 | 100.0 |
| Longitudinal Aquaplane | 100.0 | 105.0 |
| Lateral Aquaplane | 100.0 | 112.0 |
| Snow Handling | 100.0 | 110.0 |
| Snow Traction | 100.0 | 110.0 |
| Snow Braking | 100.0 | 105.0 |
| Ice Traction | 100.0 | 100.0 |
| Ice Braking | 100.0 | 105.0 |
| Dry Handling | 100.0 | 101.0 |
| Dry Braking | 100.0 | 102.5 |

The invention claimed is:

1. A tyre for a vehicle wheel comprising a tread having a tread pattern, said tread being separable by an equatorial plane of said tyre in a first half and in a second half, said first half of said tread comprising a first shoulder portion of said tread, said second half of said tread comprising a second shoulder portion of said tread, wherein said tread pattern comprises a sequence of substantially identical modules of grooves circumferentially disposed along said tread, each of said modules comprising:
   a) a first slanted transverse groove extending from said first shoulder portion of said tread to a first end, said first slanted transverse groove crossing said equatorial plane so that said first end is located in said second half of said tread;
   b) a second slanted transverse groove extending from said second shoulder portion of said tread to a second end, said second slanted transverse groove crossing said equatorial plane so that said second end is located in said first half of said tread;
   c) a third slanted transverse groove extending from said first shoulder portion of said tread to a third end located in said first half of said tread; and
   d) a fourth slanted transverse groove extending from said second shoulder portion of said tread to a fourth end located in said second half of said tread,
   wherein:
   e) said first end is substantially located at an intermediate portion of said second slanted transverse groove;
   f) said second end is substantially located at an intermediate portion of a first slanted transverse groove of a circumferentially adjacent module; and
   g) each of said modules comprises: a first V-shaped block formed between said third slanted transverse groove and said first slanted transverse groove of said circumferentially adjacent module, said first V-shaped block having vertices located in said first half of the tread; and
   a second V-shaped block formed between said fourth slanted transverse groove and said second slanted transverse groove of said circumferentially adjacent module, said second V-shaped block having vertices located in said second half of the tread.

2. The tyre according to claim 1, wherein each of said modules comprises:
   a first bridging groove extending substantially from said third end of said third slanted transverse groove toward said first slanted transverse groove; and
   a second bridging groove extending substantially from said fourth end of said fourth slanted transverse groove toward said second slanted transverse groove.

3. The tyre according to claim 2, wherein said first bridging groove connects said third slanted transverse groove to said first slanted transverse groove.

4. The tyre according to claim 2, wherein said second bridging groove connects said fourth slanted transverse groove to said second slanted transverse groove.

5. The tyre according to claim 2, wherein each of said modules comprises:
   a third bridging groove extending between said third slanted transverse groove and said first slanted transverse groove; and
   a fourth bridging groove extending between said fourth slanted transverse groove and said second slanted transverse groove.

6. The tyre according to claim 5, wherein said third bridging groove connects said third slanted transverse groove to said first slanted transverse groove.

7. The tyre according to claim 5, wherein said fourth bridging groove connects said fourth slanted transverse groove to said second slanted transverse groove.

8. The tyre according to claim 5, wherein each of said modules comprises:
   a fifth bridging groove extending between said third slanted transverse groove and said first slanted transverse groove of said circumferentially adjacent module; and
   a sixth bridging groove extending between said fourth slanted transverse groove and a second slanted transverse groove of said circumferentially adjacent module.

9. The tyre according to claim 8, wherein said fifth bridging groove connects said third slanted transverse groove to said first slanted transverse groove of said circumferentially adjacent module.

10. The tyre according to claim 8, wherein said sixth bridging groove connects said fourth slanted transverse groove to said second slanted transverse groove of said circumferentially adjacent module.

11. The tyre according to claim 1, wherein said vertices of said first V-shaped block are located at a distance between $1/10$ and $1/3$ of a width of said first half of the tread from said equatorial plane of said tyre.

12. The tyre according to claim 1, wherein said vertices of said second V-shaped block are located at a distance between $1/10$ and $1/3$ of a width of said second half of the tread from said equatorial plane of said tyre.

13. The tyre according to claim 1, wherein each of said modules comprises:
- a first substantially rectangular block formed between said first and third slanted transverse grooves, said first substantially rectangular block being located in said first half of the tread; and
- a second substantially rectangular block formed between said second and fourth slanted transverse grooves, said second substantially rectangular block being located in said second half of the tread.

14. The tyre according to claim 13, wherein said first V-shaped block and said first substantially rectangular block are circumferentially adjacent.

15. The tyre according to claim 13, wherein said second V-shaped block and said second substantially rectangular block are circumferentially adjacent.

16. The tyre according to claim 1, wherein rubber portions formed by the grooves of said modules comprise a plurality of sipes.

* * * * *